United States Patent
Nakatsuhama et al.

(10) Patent No.: US 7,424,383 B2
(45) Date of Patent: Sep. 9, 2008

(54) ABNORMALITY DETECTION DEVICE FOR DETECTING AN ABNORMALITY IN A COMMUNICATION BUS

(75) Inventors: Norihiro Nakatsuhama, Kawasaki (JP); Yoshihiko Koike, Kawasaki (JP); Osamu Tago, Kawasaki (JP); Yukihiro Ozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/778,837

(22) Filed: Feb. 8, 2001

(65) Prior Publication Data
US 2001/0023392 A1    Sep. 20, 2001

(30) Foreign Application Priority Data
Mar. 17, 2000    (JP)    ............... 2000-077016

(51) Int. Cl.
*G01R 27/28* (2006.01)
(52) U.S. Cl. .................................. 702/120
(58) Field of Classification Search ............. 702/120; 714/43; 430/825.01–825.5; 370/228; 340/825.01
See application file for complete search history.

(56) References Cited

U.S. PATENT DOCUMENTS

| | | | | |
|---|---|---|---|---|
| 4,613,858 A | * | 9/1986 | Davidson et al. | 340/825.5 |
| 4,736,366 A | * | 4/1988 | Rickard | 340/825.5 |
| 4,747,115 A | * | 5/1988 | Nambu | 340/825.01 |
| 5,204,954 A | * | 4/1993 | Hammer et al. | 710/22 |
| 5,508,997 A | * | 4/1996 | Katou | 370/228 |
| 5,511,092 A | * | 4/1996 | Cathers et al. | 375/232 |
| 5,565,856 A | * | 10/1996 | Takaba et al. | 340/3.32 |
| 5,742,851 A | * | 4/1998 | Sekine | 714/43 |
| 6,367,028 B1 | * | 4/2002 | Schmalzried | 714/1 |
| 6,553,512 B1 | * | 4/2003 | Gibson | 714/17 |
| 6,678,858 B1 | * | 1/2004 | Imazato | 714/758 |

FOREIGN PATENT DOCUMENTS

| | | | | |
|---|---|---|---|---|
| JP | 401224852 A | * | 9/1989 |
| JP | 402023735 A | * | 1/1990 |
| JP | 402041542 A | * | 2/1990 |
| JP | 405224964 A | * | 9/1993 |
| JP | 407321832 A | * | 12/1995 |
| JP | 408079281 A | * | 3/1996 |

* cited by examiner

*Primary Examiner*—Bryan Bui
*Assistant Examiner*—Aditya S. Bhat
(74) *Attorney, Agent, or Firm*—Staas & Halsey LLP

(57) ABSTRACT

An abnormality detection device detects an abnormality in a communication bus. The abnormality detection device comprises a timer counter connected to the communication bus so as to measure a time during which a signal having a first logical level is transmitted in the communication bus, and a comparator outputting an abnormality detection signal indicating an abnormality in the communication bus when the time measured by the timer counter surpasses a threshold value.

9 Claims, 11 Drawing Sheets

ABNORMALITY DETECTION DEVICE FOR DETECTING AN ABNORMALITY IN A COMMUNICATION BUS

BACKGROUND OF THE INVENTION

1. Field of the Invention

The present invention generally relates to an abnormality detection device and, more particularly, to an abnormality detection device for detecting an abnormality in a communication via a communication bus, and a microcomputer connected to the communication bus.

2. Description of the Related Art

Recently, semiconductor devices having various communication protocols have been developed. Also, a system has been developed in which system a plurality of semiconductor devices are connected to each other by a communication bus and, when any one of the semiconductor devices operates as a master, the other semiconductor devices are made to operate as slaves, i.e., subordinately, to the semiconductor device operating as a master. The communication bus in this system is called a "multi-master communication bus".

Accordingly, a circuit for monitoring a communication status in such a system as mentioned above is becoming an important factor in securing a reliability of a communication in the system and a reliability of the system itself. In this circuit, timeout detection is conventionally employed as a monitoring method. With the "timeout detection", when next information is not received within a predetermined time, an abnormal state such as a trouble is assumed to occur.

However, the conventional timeout detection only monitors a response time from other semiconductor devices and a state of congestion in a communication bus. Additionally, the conventional timeout detection is realized simply by software, only securing a minimal reliability of a communication.

Recently, however, such a system as mentioned above is becoming more and more complicated, and thus, an unexpected communication abnormality, a delay of a communication and the like occurring in the communication bus of the system may adversely influence the whole system. Therefore, a higher reliability of the communication is required to be secured.

Conventionally, to elevate the above-mentioned reliability, such a measure has been taken as making a program to raise a frequency of monitoring the communication bus and executing the program in a device having a CPU. However, this disadvantageously puts a heavy load on software including the program. Also, this is faced by another problem that a throughput of the system limits a frequency of monitoring the communication bus, deteriorating an accuracy of the timeout detection.

SUMMARY OF THE INVENTION

It is a general object of the present invention to provide an improved and useful abnormality detection device for detecting an abnormality in a communication via a communication bus in which device the above-mentioned problems are eliminated.

A more specific object of the present invention is to provide an abnormality detection device for increasing a reliability of a communication via a communication bus, and a microcomputer connected to the communication bus.

In order to achieve the above-mentioned objects, there is provided according to one aspect of the present invention an abnormality detection device for detecting an abnormality in a communication bus, the device comprising:

a timer counter connected to the communication bus so as to measure a time during which a signal having a first logical level is transmitted in the communication bus; and a comparator outputting an abnormality detection signal indicating an abnormality in the communication bus when the time measured by the timer counter surpasses a threshold value.

According to the present invention, a status of a communication via a communication bus can be monitored all the time by the timer counter. This enhances a reliability of the communication.

Additionally, in the abnormality detection device according to the present invention, the timer counter may be initialized at intervals determined according to an event signal supplied thereto.

According to the present invention, by selectively supplying the event signal, a method of the abnormality detection can be arbitrarily realized.

Additionally, the abnormality detection device according to the present invention may comprise at least two units of the timer counter and the comparator, the timer counter in each of the units being individually initialized at the intervals.

According to the present invention, abnormality detections of different methods can be performed in parallel. Therefore, even in a case where which method of the abnormality detection should be used is found out after the measuring of the time is started, a required method of the abnormality detection can surely be executed.

Additionally, the abnormality detection device according to the present invention may further comprise:

a plurality of comparison value registers respectively storing a plurality of threshold value s; and a selector selecting a threshold value from among the plurality of the threshold values according to a selection signal supplied thereto so as to supply the threshold value to the comparator.

According to the present invention, different methods of abnormality detection can be selectively executed at ease, making the abnormality detection device more general purpose.

In order to achieve the above-mentioned objects, there is also provided according to another aspect of the present invention an abnormality detection device for detecting an abnormality in a communication bus, the device comprising:

at least two timer counters each connected to the communication bus so as to measure a time during which a signal having a first logical level is transmitted in the communication bus;

a register cumulatively adding the time measured by at least one of the at least two timer counters, the register being initialized at predetermined intervals; and a comparator outputting an abnormality detection signal indicating an abnormality in the communication bus when a cumulative time obtained by the register surpasses a threshold value.

According to the present invention, an abnormality detection using the cumulative time in detecting a timeout can easily be achieved.

Additionally, in the abnormality detection device according to the present invention, the register may supply the cumulative time to at least one of the at least two timer counters, and the at least one of the at least two timer counters may measure the time by using the cumulative time as an initial value.

According to the present invention, the timer counter can measure the time in various ways, making the abnormality detection device more general purpose.

In order to achieve the above-mentioned objects, there is also provided according to still another aspect of the present invention a microcomputer connected to a communication bus, the microcomputer comprising:

a timer counter connected to the communication bus so as to measure a time during which a signal having a first logical level is transmitted in the communication bus; and a comparator outputting an abnormality detection signal indicating an abnormality in the communication bus when the time measured by the timer counter surpasses a threshold value.

According to the present invention, a status of a communication of a microcomputer via a communication bus can be monitored all the time by the timer counter. This provides a microcomputer having an enhanced reliability of communication via the communication bus.

Other objects, features and advantages of the present invention will become more apparent from the following detailed description when read in conjunction with the accompanying drawings.

DETAILED DESCRIPTION OF THE PREFERRED EMBODIMENTS

Figure 1:
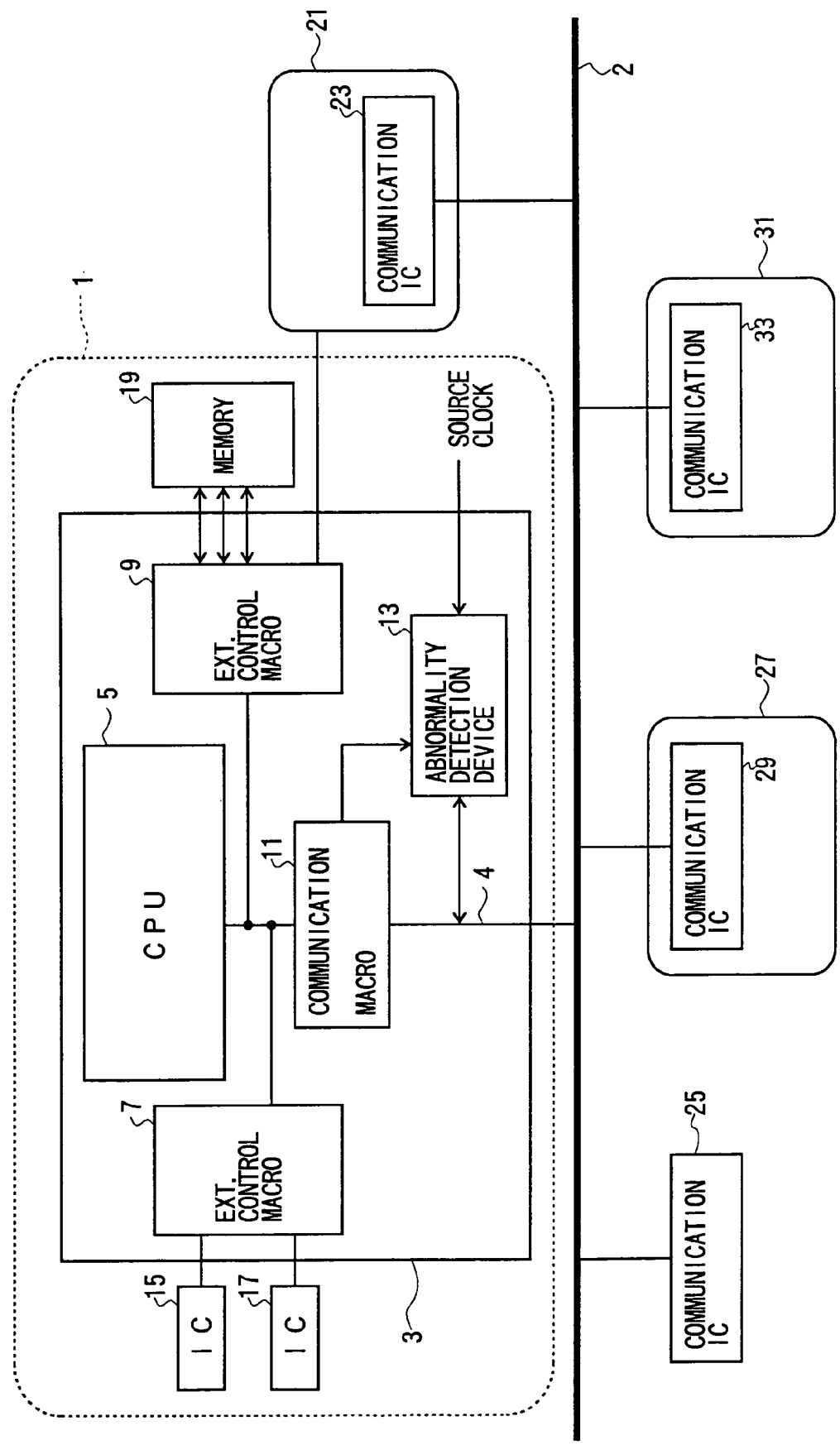
FIG. 1 is an illustration of a structure of a microcomputer comprising an abnormality detection device according to a first embodiment of the present invention.

A description will now be given, with reference to the drawings, of embodiments according to the present invention. Elements in the drawings that are identical or equivalent are referenced by the same characters.

1. First Embodiment

FIG. 1 is an illustration of a structure of a microcomputer 3 comprising an abnormality detection device 13 according to a first embodiment of the present invention for detecting an abnormality in a communication bus. As shown in FIG. 1, the microcomputer 3 is included in a first system 1. The first system 1 is connected to a communication bus 2. To the communication bus 2 are also connected a communication integrated circuit (communication IC) 25, a communication IC 23 included in a second system 21, a communication IC 33 included in a third system 31 and a communication IC 29 included in an nth system 27 (n is an integer).

The microcomputer 3 comprises a timeout detection bus line 4, a central processing unit (CPU) 5, external control macros 7 and 9, a communication macro 11 and the abnormality detection device 13. The external control macros 7 and 9 and the communication macro 11 are connected to the CPU 5. The timeout detection bus line 4 connects the communication macro 11 and the communication bus 2. The abnormality detection device 13 is connected to the communication macro 11 and the timeout detection bus line 4. The external control macro 7 is also connected to integrated circuits (ICs) 15 and 17 arranged outside the microcomputer 3. The external control macro 9 is also connected to a memory 19 arranged outside the microcomputer 3, and to the second system 21.

In the microcomputer 3 having the above-mentioned structure, the communication macro 11 controls communications between the microcomputer 3 and external systems, such as the second system 21 and the third system 31, according to instructions from the CPU 5. The external control macro 7 controls the ICs 15 and 17 according to instructions from the CPU 5. The external control macro 9 reads data from and writes data to the memory 19 according to instructions from the CPU 5. The external control macro 9 also accesses the second system 21.

Figure 2:
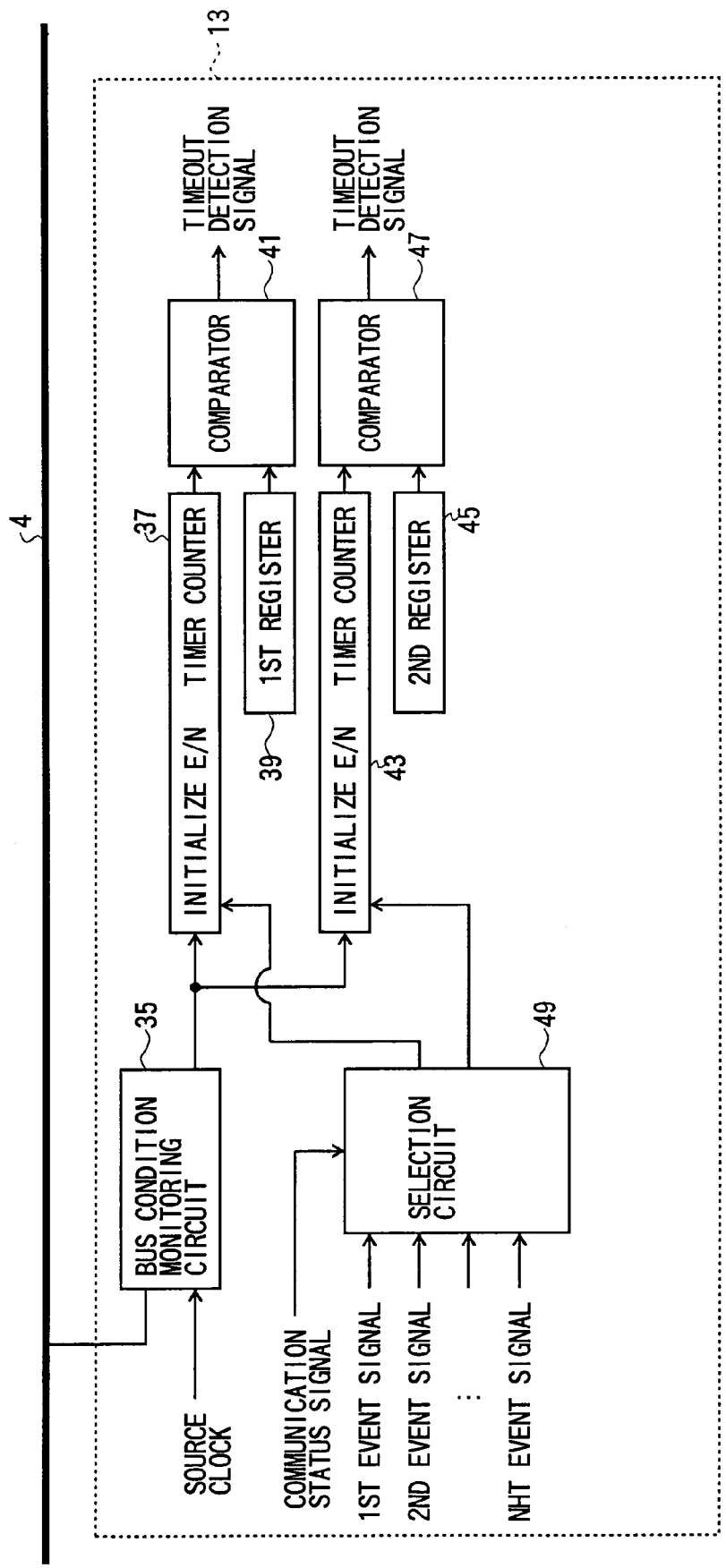
FIG. 2 is an illustration of a structure of the abnormality detection device shown in FIG. 1.

FIG. 2 is an illustration of a basic structure of the abnormality detection device 13 shown in FIG. 1. As shown in FIG. 2, the abnormality detection device 13 comprises a bus condition monitoring circuit 35, timer counters 37 and 43, a first register 39, a second register 45, comparators 41 and 47, and a selection circuit 49. The bus condition monitoring circuit 35 is connected to the timeout detection bus line 4. A source clock is supplied from outside the microcomputer 3 and is input into the bus condition monitoring circuit 35. The selection circuit 49 is supplied with a communication status signal from the communication macro 11 (shown in FIG. 1), and is also supplied with first to nth event signals from the communication macro 11 or the timeout detection bus line 4.

The communication status signal indicates a type of a relative action of the first system to the other systems, and according to the type, a method of monitoring a communication condition is selected. The above-mentioned event signals are used to determine a timing to initialize the timer counters 37 and 43. For example, the first event signal is activated each time a signal transmitting through the timeout detection bus line 4 transits from a low (L) level to a high (H) level, and the second event signal is a signal activated each time data transmitting through the timeout detection bus line 4 becomes one byte.

The timer counter 37 is connected to the bus condition monitoring circuit 35 and the selection circuit 49. The comparator 41 is connected to the timer counter 37 and the first register 39. In addition, the timer counter 43 is connected to the bus condition monitoring circuit 35 and the selection circuit 49. The comparator 47 is connected to the timer counter 43 and the second register 45.

Next, a description will be given of operations of the abnormality detection device 13 shown in FIG. 2. The bus condition monitoring circuit 35 continually monitors the timeout detection bus line 4 for a timeout and automatically detects a timeout. How frequently the bus condition monitoring circuit 35 detects a timeout is determined according to a frequency of the source clock supplied thereto. Thus, an error in detecting a timeout can be reduced by adjusting the frequency of the source clock.

Each of the timer counters 37 and 43 counts a time only when the bus condition monitoring circuit 35 detects a timeout. In doing this, the timer counters 37 and 43 are respectively initialized by the event signals selectively supplied from the selection circuit 49 according to the communication status signal. Therefore, each of the timer counters 37 and 43 counts the time using a method according to the communication status signal. Thus, not other circuits or software, but the abnormality detection device 13 according to the present invention can achieve a timeout detection.

For example, when the first event signal is selected by the communication status signal in the selection circuit 49 and is supplied to the timer counter 37, the timer counter 37 is initialized each time the signal transmitting through the timeout detection bus line 4 transits from the low (L) level to the high (H) level. Thereby, in this case, the timer counter 37 counts a time during which the signal transmitting through the timeout detection bus line 4 is at the low (L) level.

Also, for example, when the second event signal is selected by the communication status signal in the selection circuit 49 and is supplied to the timer counter 43, the timer counter 43 is initialized each time one-byte data transmits through the timeout detection bus line 4. Thereby, in this case, the timer counter 43 counts a duration of a low-level signal between one-byte data.

Predetermined values of time are stored beforehand in the first register 39 and the second register 45, respectively. The comparators 41 and 47 compare counted values of time supplied from the timer counters 37 and 43 with the predetermined values of time, respectively. Then, when the counted values of time reach the predetermined values of time, respectively, the comparators 41 and 47 supply timeout detection signals to the timeout detection bus line 4. Therefore, by storing arbitrary values of time in the first register 39 and the second register 45, limit times over which timeouts are detected can be set as required.

Additionally, as described above, by arranging a plurality of units comprising the timer counter, the register and the comparator in the abnormality detection device 13, a time or a duration of a low-level signal transmitting through the timeout detection bus line 4 can be counted in parallel in different ways. Thereby, when a communication status is not determined yet due to a conflict over the communication bus with other communication ICs, a time or a duration of a low-level signal transmitting through the timeout detection bus line 4 can provisionally be counted in parallel in different ways so that, once the communication status is determined, either of values of time counted in the different ways can be employed. This way, an optimal timeout detection can be realized in accordance with operating conditions of the microcomputer 3.

Figure 3:
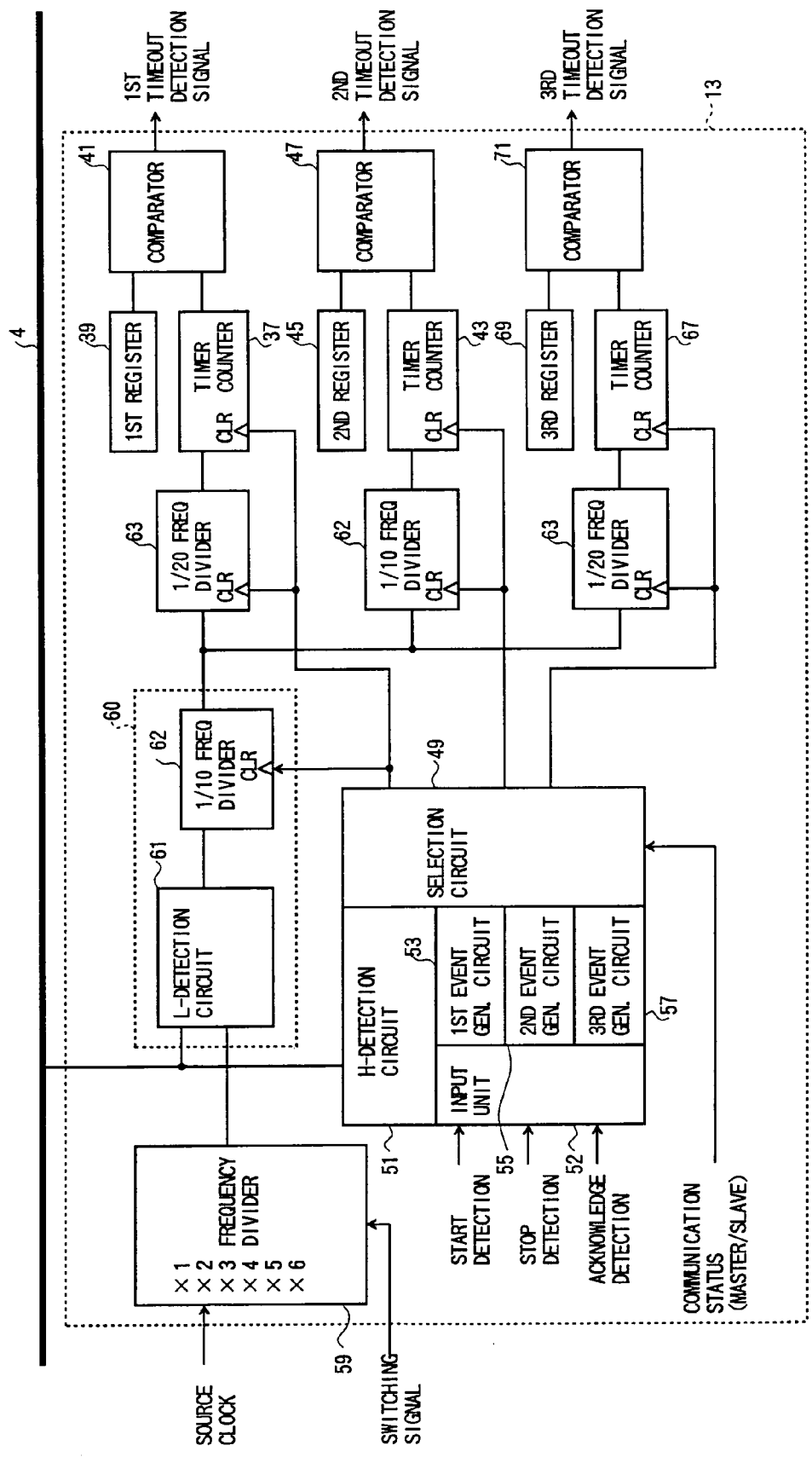
FIG. 3 is an illustration of a specific example of the abnormality detection device shown in FIG. 2.

Next, a description will be given, with reference to FIG. 3, of a more specific example of the abnormality detection device 13 shown in FIG. 2. As shown in FIG. 3, the abnormality detection device 13 comprises the timer counters 37 and 43, a timer counter 67, the first register 39, the second register 45, a third register 69, the comparators 41 and 47, a comparator 71, the selection circuit 49, a high-level detection circuit 51, an input unit 52, a first-event generation circuit 53, a second-event generation circuit 55, a third-event generation circuit 57, a frequency divider 59, a low-level detection unit 60, one-tenth frequency dividers 62, and one-twentieth frequency dividers 63. The low-level detection unit 60 comprises a low-level detection circuit 61 and one of the one-tenth frequency dividers 62. It is noted that the frequency divider 59 may be arranged outside the abnormality detection device 13.

Hereinafter, a description will be given of operations of the abnormality detection device 13 shown in FIG. 3. The frequency divider 59 can divide a frequency by a frequency rate ranging from 1 to 6. The frequency rate is selected by a switching signal supplied from the communication macro 11. The frequency divider 59 divides a frequency of the input source clock by the selected frequency rate, and outputs the source clock having the divided frequency to the low-level detection circuit 61.

The low-level detection circuit 61 monitors a condition of the timeout detection bus line 4. Specifically, when data transmitting through the timeout detection bus line 4 becomes low-level, the low-level detection circuit 61 generates a count-up pulse according to a clock signal of the source clock supplied from the frequency divider 59. Then, the count-up pulse is divided by 10 in the one-tenth frequency divider 62, while a low-level signal having a width equal to or smaller than a low-level width of the source clock having the frequency thereof also divided by 10 is removed. This filtering provides a predetermined resolution and avoids a malfunction due to noise, etc.

A clock signal output from the one-tenth frequency divider 62 is supplied to the one-twentieth frequency dividers 63 and the other one-tenth frequency divider 62, and a frequency thereof is divided by 20 or 10, respectively. The timer counter 37 counts up according to a signal supplied from one of the one-twentieth frequency dividers 63. The comparator 41 compares the counted value with a predetermined value stored beforehand in the first register 39. Then, when the counted value is judged to be equal to the predetermined value, the comparator 41 outputs a first timeout detection signal to the timeout detection bus line 4. The first timeout detection signal is acknowledged by the communication macro 11 of each of the systems, or by the communication ICs 23, 25, 29 or 33, and a communication between the systems is discontinued.

Similarly, the timer counter 43 counts up according to a signal supplied from the other one-tenth frequency divider 62. The comparator 47 compares the counted value with a predetermined value stored beforehand in the second register 45. Then, when the counted value is judged to be equal to the predetermined value, the comparator 47 outputs a second timeout detection signal to the timeout detection bus line 4.

Likewise, the timer counter 67 counts up according to a signal supplied from the other one-twentieth frequency divider 63. The comparator 71 compares the counted value with a predetermined value stored beforehand in the third register 69. Then, when the counted value is judged to be equal to the predetermined value, the comparator 71 outputs a third timeout detection signal to the timeout detection bus line 4.

The high-level detection circuit 51 detects high-level data transmitted to the timeout detection bus line 4 so as to generate a high-level detection signal. A start detection signal, a stop detection signal and an acknowledge detection signal are supplied from the communication macro 11 or the timeout detection bus line 4 to the input unit 52. The first-event generation circuit 53, the second-event generation circuit 55 and the third-event generation circuit 57 generate the first to third event signals according to the high-level detection signal, the start detection signal, the stop detection signal and the acknowledge detection signal.

Specifically, the first-event generation circuit 53 generates the first event signal which is activated each time a signal transmitting through the timeout detection bus line 4 transits from a low (L) level to a high (H) level in a period from an input of the start detection signal to an input of the stop detection signal. The second-event generation circuit 55 generates the second event signal which is activated each time data transmitting through the timeout detection bus line 4 becomes one byte in the period from an input of the start detection signal to an input of the stop detection signal. The third-event generation circuit 57 generates the third event signal that is activated when the start detection signal is input or when the stop detection signal is input.

Then, the selection circuit 49 supplies the timer counters 37, 43 and 67, the one-tenth frequency dividers 62 and the one-twentieth frequency dividers 63 with an event signal selected from the first to third event signals according to the communication status signal supplied from the communication macro 11. Then, the timer counters 37, 43 and 67, the one-tenth frequency dividers 62 and the one-twentieth frequency dividers 63 are respectively initialized (reset) by the event signal being activated.

It is noted here that the above-mentioned communication status signal is a signal indicating whether the microcomputer 3 takes a leading role as a master to other systems or acts subordinately as a slave. When the communication status signal indicates the microcomputer 3 as a master, the second event signal is supplied to the timer counter 43 and the other one-tenth frequency divider 62. When the communication status signal indicates the microcomputer 3 as a slave, the third event signal is supplied to the timer counter 67 and the other one-twentieth frequency divider 63.

As described above, according to the abnormality detection device 13 shown in FIG. 3, the timer counters 37, 43 and 67 in parallel count a time during which a signal transmitting through the timeout detection bus line 4 is at a low (L) level, and are respectively initialized (reset) by the first to third event signals at different timings. Therefore, a timeout detection in accordance with operating conditions of the microcomputer 3 can be realized by a hardware structure.

This allows for simplifying a program detecting an abnormality in the timeout detection bus line 4 and thereby reducing a burden of software so as to increase an operating speed of the entire first system.

Figure 4:
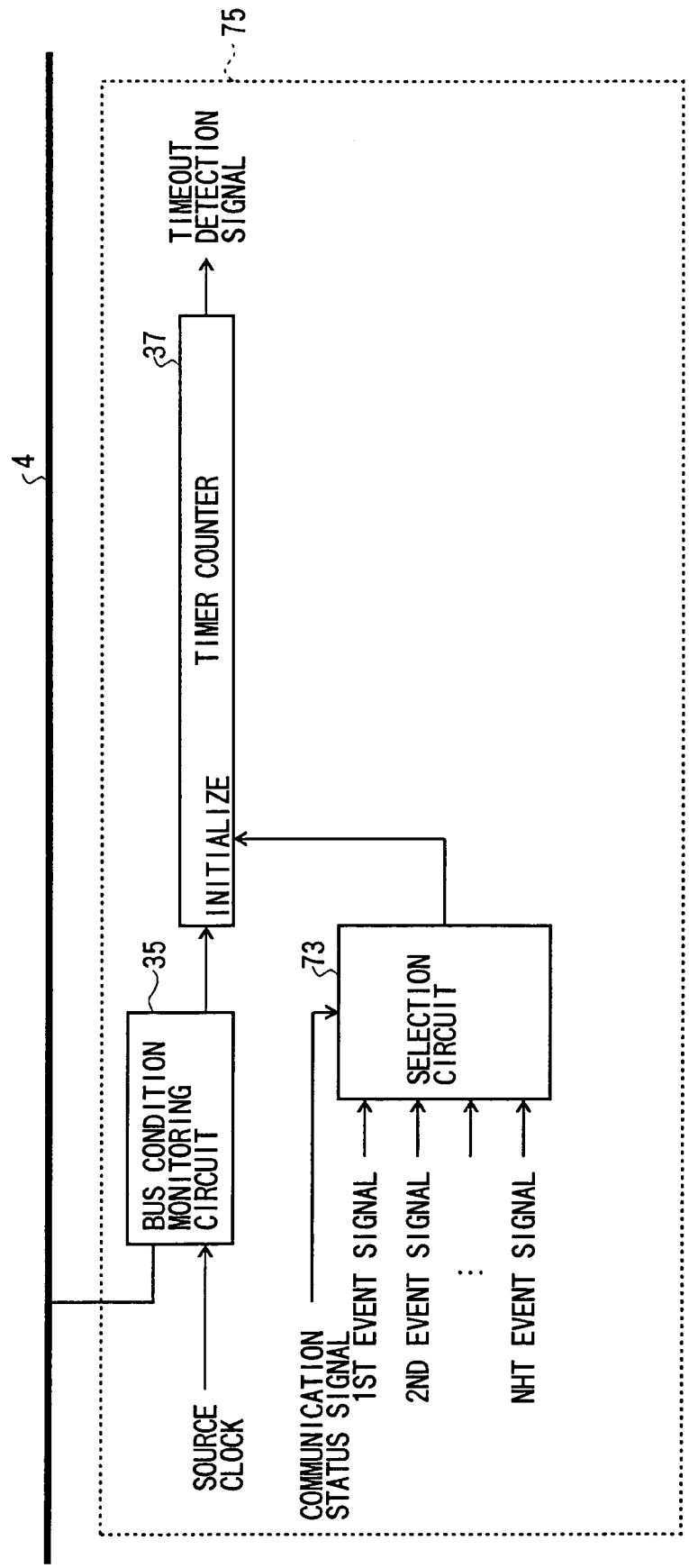
FIG. 4 is an illustration of another structure of the abnormality detection device according to the first embodiment.

The abnormality detection device 13 shown in FIG. 2 and FIG. 3 can be simplified as shown in FIG. 4. FIG. 4 is an illustration of another structure of the abnormality detection device according to the first embodiment. As shown in FIG. 4, an abnormality detection device 75 comprises the bus condition monitoring circuit 35, the timer counter 37 and a selection circuit 73. That is, the abnormality detection device 75 comprises only the timer counter 37 as a timer counter. In this structure, the timer counter 37 counts a value of time according to a signal supplied from the bus condition monitoring circuit 35 until the counted value reaches a predetermined value, when the timer counter 37 outputs the timeout detection signal. In this case, as well, the timer counter 37 is initialized at different timings according to a type of the event signals supplied from the selection circuit 73. Compared with the structure of the abnormality detection device 13 shown in FIG. 2, this structure does not need the first register 39, the comparator 41, the timer counter 43, the second register 45 or the comparator 47, and thus reduces a circuit scale of the abnormality detection device.

Figure 5:
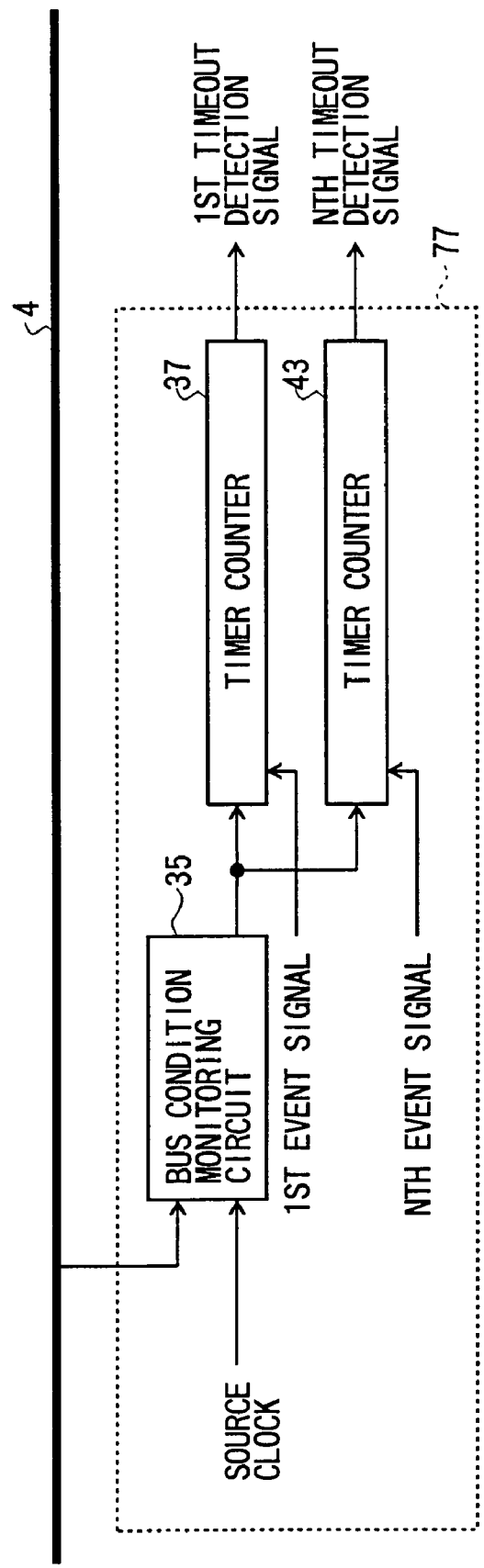
FIG. 5 is an illustration of still another structure of the abnormality detection device according to the first embodiment.

The abnormality detection device 13 shown in FIG. 2 and FIG. 3 may have a structure shown in FIG. 5 in which the event signals are supplied directly to the timer counters. FIG. 5 is an illustration of still another structure of the abnormality detection device according to the first embodiment. As shown in FIG. 5, an abnormality detection device 77 comprises the bus condition monitoring circuit 35 and the timer counters 37 and 43. In this structure, the first event signal is supplied directly to the timer counter 37, not via a selection circuit. Likewise, the nth event signal is supplied directly to the timer counter 43. This structure does not need the selection circuit, and thus further reduces a circuit scale of the abnormality detection device. In the abnormality detection device 77 shown in FIG. 5, the timer counter 37 is initialized according only to the first event signal, and the timer counter 43 is initialized according only to the nth event signal.

Figure 6:
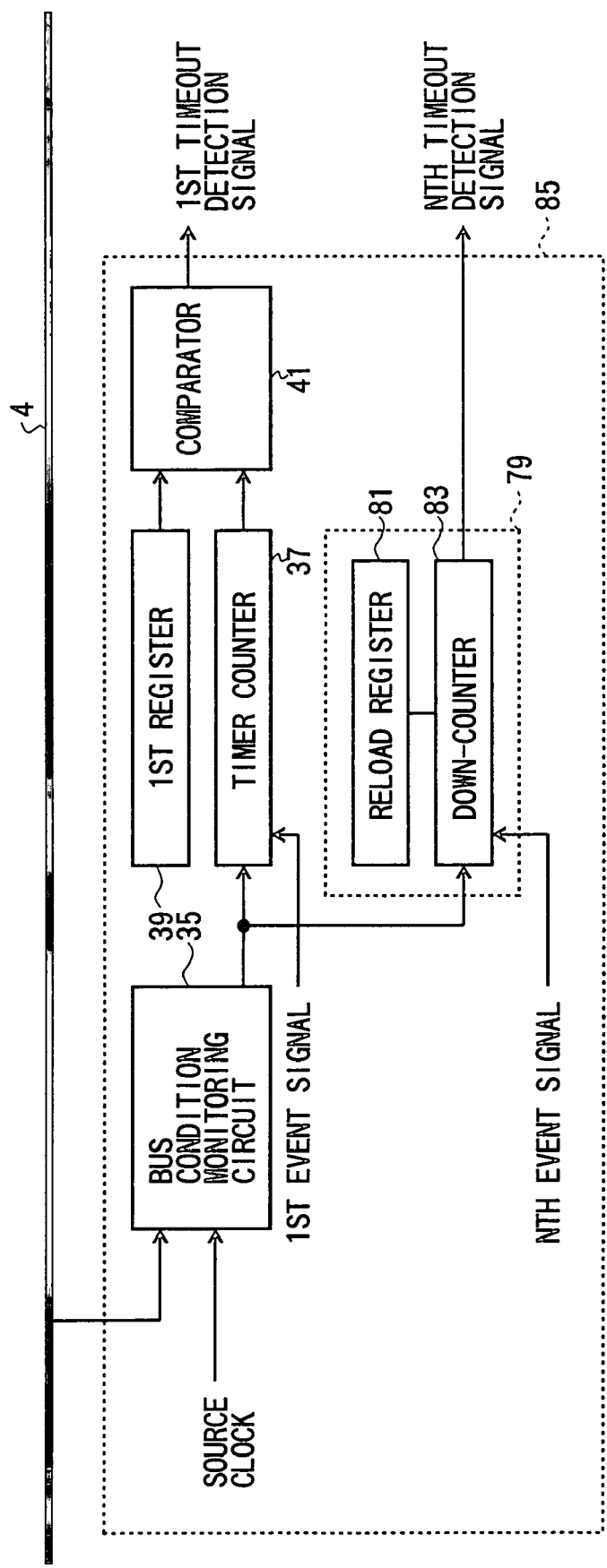
FIG. 6 is an illustration of still another structure of the abnormality detection device according to the first embodiment.

Additionally, the abnormality detection device 13 shown in FIG. 2 and FIG. 3 may have a structure shown in FIG. 6. As shown in FIG. 6, an abnormality detection device 85 comprises: the bus condition monitoring circuit 35; the timer counter 37; the first register 39 arranged parallel thereto; the comparator 41 connected to the timer counter 37 and the first register 39; and an reload timer 79 in place of the timer counter 43 and the second register. The reload timer 79 comprises a reload register 81 and a down-counter 83.

The reload timer 79 is started after being initialized according to the nth event signal supplied thereto, with a predetermined value stored beforehand in the reload register 81 being loaded into the down-counter 83. Then, the down-counter 83 counts down from the predetermined value. Subsequently, when the down-counter 83 counts down to zero or below, i.e., an underflow state is detected, the down-counter 83 outputs an nth timeout detection signal. In this way, the structure using a reload timer can realize a required timeout detection.

Figure 7:
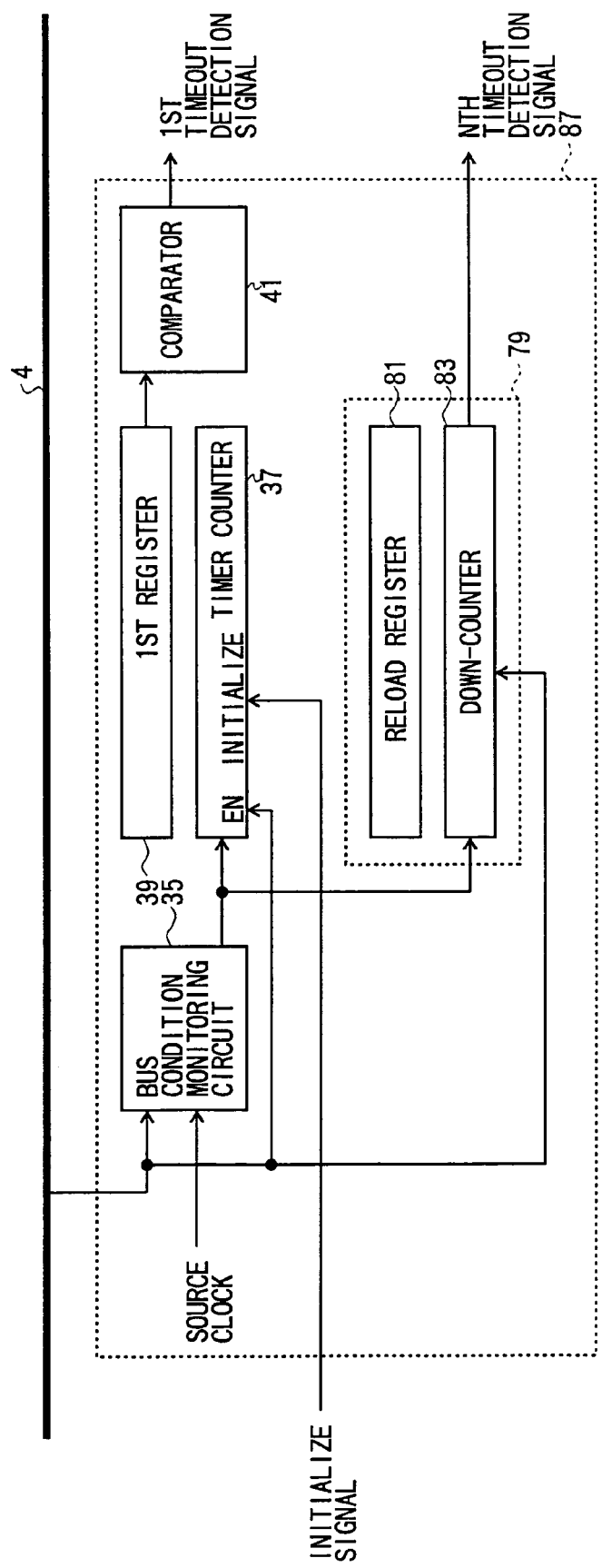
FIG. 7 is an illustration of still another structure of the abnormality detection device according to the first embodiment.

Further, the abnormality detection device 13 shown in FIG. 2 and FIG. 3 may have a structure shown in FIG. 7. As shown in FIG. 7, an abnormality detection device 87 comprises, as does the abnormality detection device 85 shown in FIG. 6, the bus condition monitoring circuit 35, the timer counter 37, the first register 39, the comparator 41, and the reload timer 79 including the reload register 81 and the down-counter 83. A signal transmitting through the timeout detection bus line 4 is supplied to the timer counter 37 and the down-counter 83 as the first event signal and the nth event signal, respectively. In this structure, at a so-called fall time when data transmitting through the timeout detection bus line 4 falls from a high level to a low level, the timer counter 37 and the down-counter 83 are started.

The timer counter 37 is initialized only by an initialize signal. The comparator 41 compares a threshold value of time of a low(L)-level signal stored beforehand in the first register 39 and a value counted by the timer counter 37. Then, when the counted value reaches the threshold value, the comparator 41 outputs the first timeout detection signal, realizing a timeout counting.

The reload timer 79 is initialized at the start when a threshold value, defined in bits, of low(L)-level data stored beforehand in the reload register 81 is loaded into the down-counter 83. Then, the down-counter 83 counts down from the threshold value. Subsequently, when the down-counter 83 counts down to zero or below, i.e., the underflow state is detected, the down-counter 83 outputs the nth timeout detection signal. The timer counter 37 and the down-counter 83 are stopped at a so-called rise time when data transmitting through the timeout detection bus line 4 rises from a low level to a high level. In this way, according to the abnormality detection device 87 having the structure shown in FIG. 7, a simple structure can realize timeout detections in different ways in a parallel manner.

2. Second Embodiment

Figure 8:
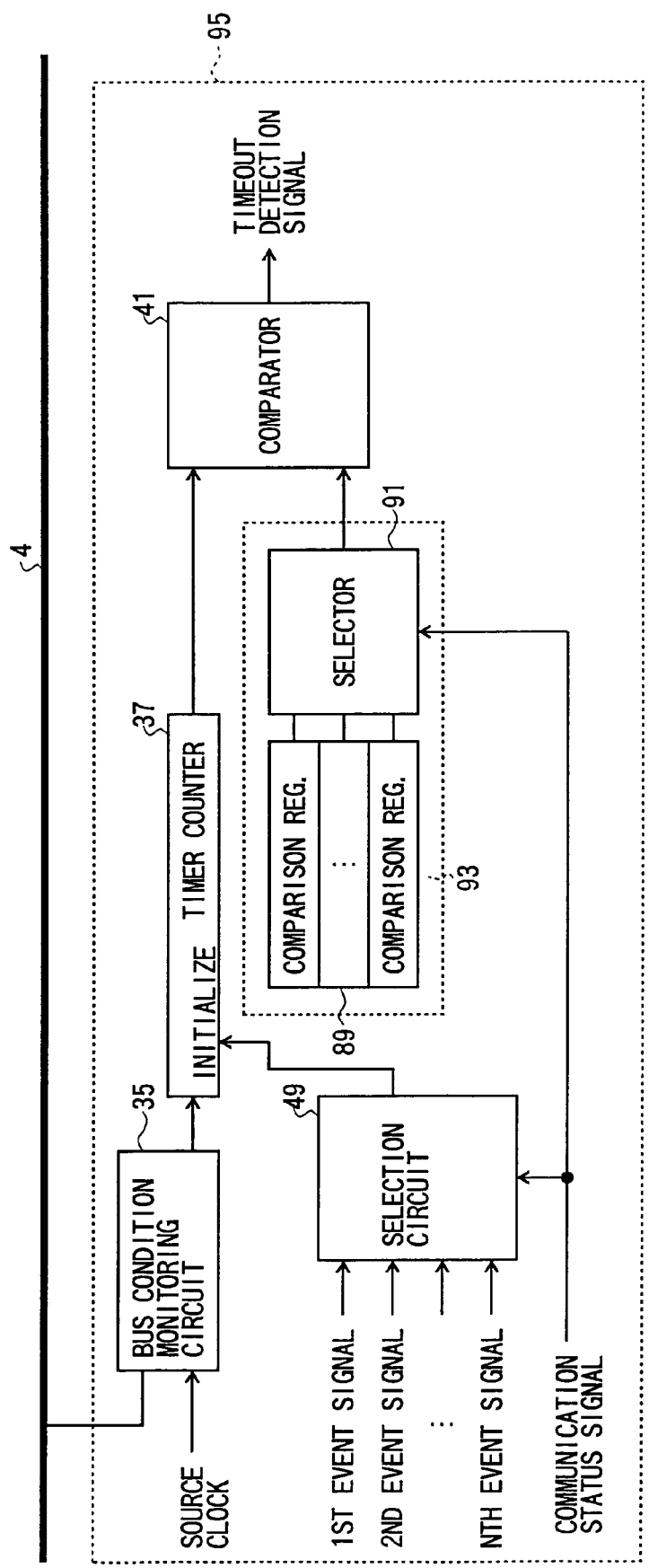
FIG. 8 is an illustration of a structure of an abnormality detection device according to a second embodiment of the present invention.

FIG. 8 is an illustration of a structure of an abnormality detection device 95 according to a second embodiment of the present invention. As shown in FIG. 8, the abnormality detection device 95 comprises the similar structure to the abnormality detection device 13 according to the first embodiment shown in FIG. 2, except for a reference value supply unit 93 connected to the comparator 41.

The reference value supply unit 93 comprises a plurality of comparison value registers 89 respectively storing different predetermined values, and a selector 91 connected with the comparison value registers 89. The selector 91 is supplied with the communication status signal, and is connected to the comparator 41. It is noted that the comparison value registers 89 may be replaced by a random access memory (RAM) as mentioned later.

The abnormality detection device 95 according to the second embodiment having the above-mentioned structure operates in the same manner as the abnormality detection device 13 according to the first embodiment, except that the selector 91 selects one of the different predetermined values stored in the comparison value registers 89 according to the supplied communication status signal, and then supplies the selected predetermined value to the comparator 41.

Therefore, the abnormality detection device 95 according to the second embodiment can not only provide the same effect as the abnormality detection device 13 according to the first embodiment, but also achieve an enhanced degree of freedom in setting a threshold value (timeout limit) for detecting a time out, since different values can be arbitrarily stored in the comparison value registers 89. Further, by switching the communication status signal, the threshold value (timeout limit) can be easily adjusted.

Figure 9:
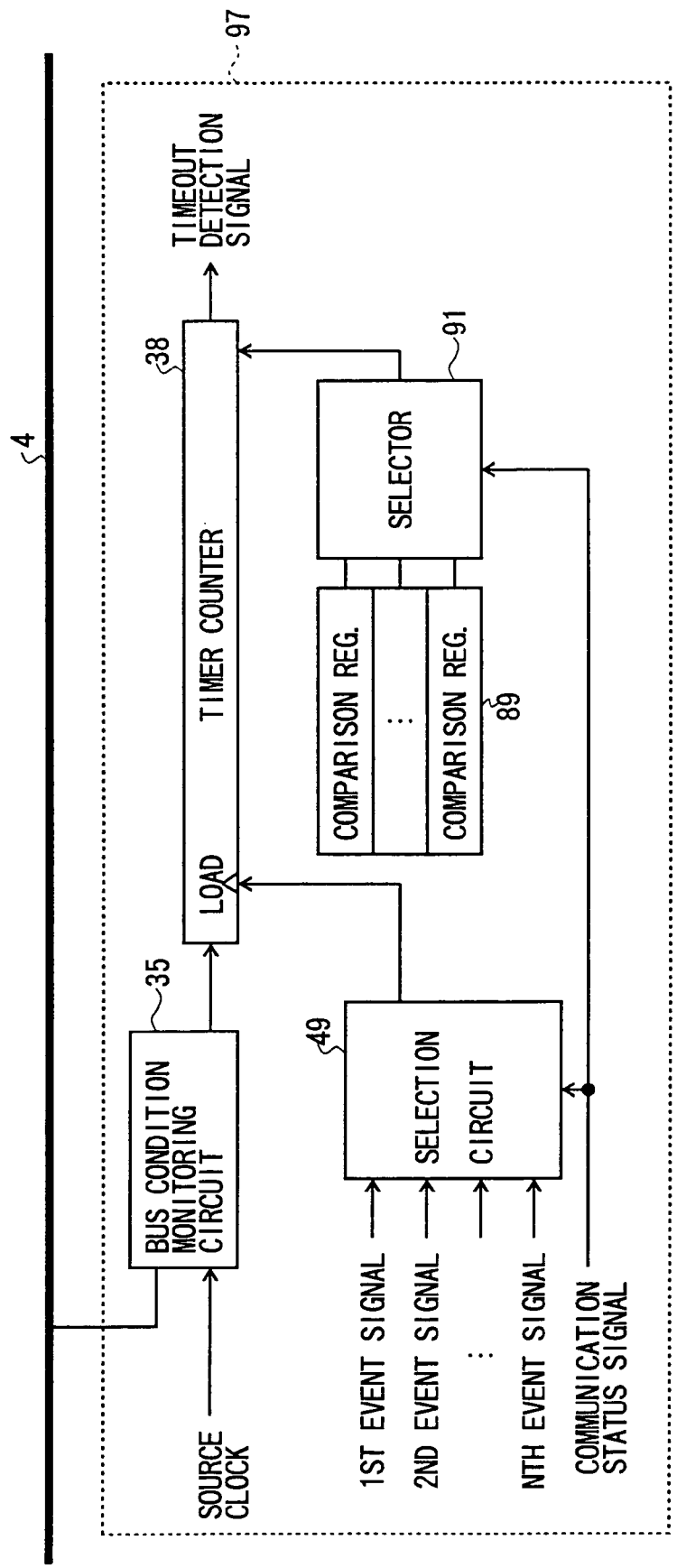
FIG. 9 is an illustration of another structure of the abnormality detection device according to the second embodiment of the present invention.

The abnormality detection device 95 shown in FIG. 8 may have a structure shown in FIG. 9. As shown in FIG. 9, an abnormality detection device 97 does not include the comparator 41 but includes a timer counter 38 in place of the timer counter 37. The abnormality detection device 97 operates in the same manner as the abnormality detection device 95 shown in FIG. 8, except in the following respects. The selector 91 supplies a signal indicating the selected predetermined value directly to the timer counter 38. The timer counter 38 counts up a value according to a signal supplied from the bus condition monitoring circuit 35. Then, when the counted value overflows the selected predetermined value, the timer counter 38 outputs the timeout detection signal. It is noted that the timer counter 38 loads itself with the selected predetermined value supplied from the selector 91, according to the event signal selectively supplied from the selection circuit 49.

The abnormality detection device 97 having this structure does not need the comparator 41, compared with the abnormality detection device 95 shown in FIG. 8. Thus a circuit scale thereof can be reduced.

3. Third Embodiment

Figure 10:
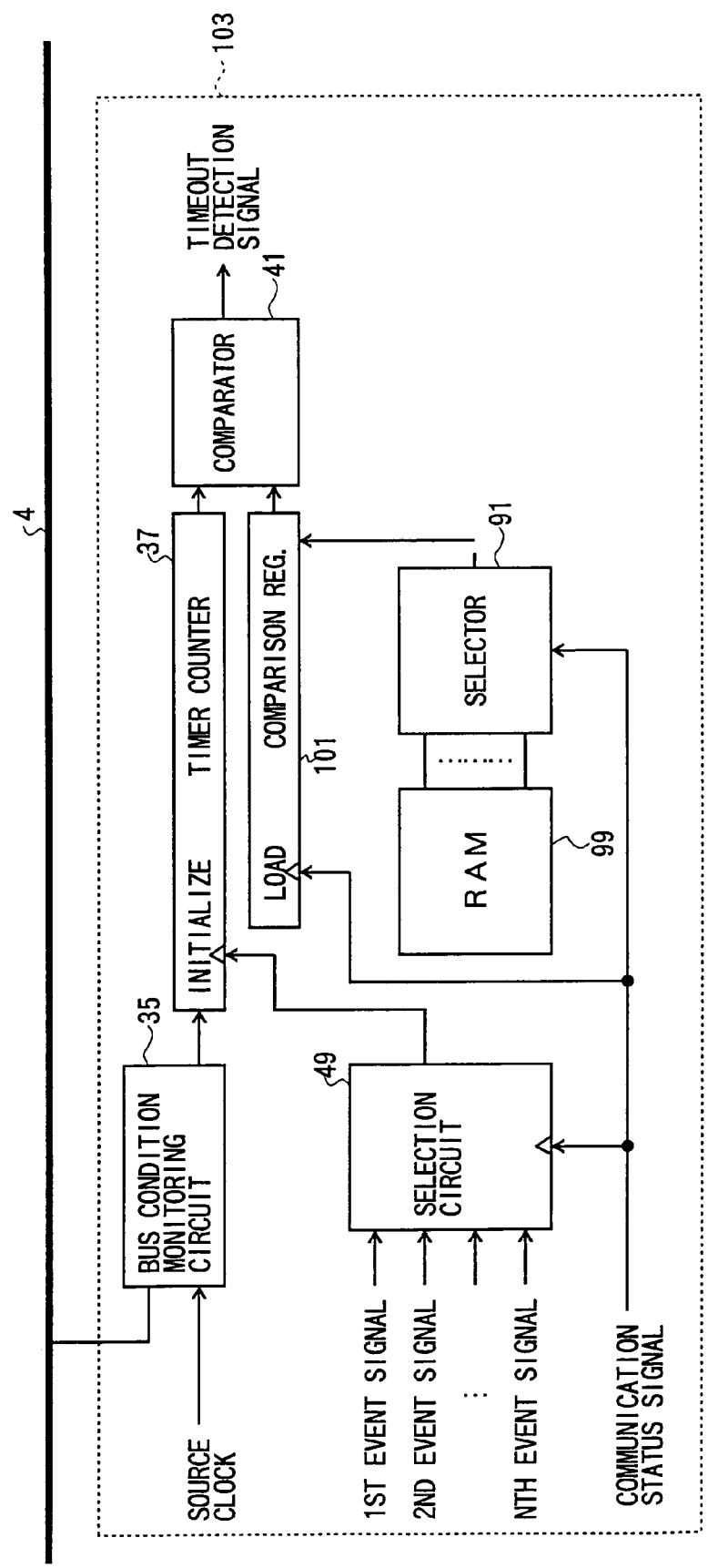
FIG. 10 is an illustration of a structure of an abnormality detection device according to a third embodiment of the present invention.

FIG. 10 is an illustration of a structure of an abnormality detection device 103 according to a third embodiment of the present invention. As shown in FIG. 10, the abnormality detection device 103 comprises the same structure as the abnormality detection device 95 according to the second embodiment shown in FIG. 8, except for a RAM 99 in place of the plurality of the comparison value registers 89 and a comparison value register 101. The comparison value register 101 is connected to the selector 91 and the comparator 41, and is supplied with the communication status signal.

The abnormality detection device 103 having this structure operates in the same manner as the abnormality detection device 95 according to the second embodiment shown in FIG. 8, except in the following respects. The selector 91 supplies the signal indicating the selected predetermined value (threshold value) to the comparison value register 101. Then, the comparison value register 101 loads itself with the selected predetermined value, according to the supplied communication status signal. Subsequently, the comparator 41 compares a value counted by the timer counter 37 with the selected predetermined value loaded into the comparison value register 101. Then, when the counted value equals the selected predetermined value, the comparator 41 outputs the timeout detection signal.

As described above, with the abnormality detection device 103 according to the third embodiment, a timeout detection limit can be easily adjusted by storing beforehand various threshold values in the RAM 99. Thus, a timeout detection in accordance with operating conditions of the microcomputer 3 can be achieved by a simple structure.

4. Fourth Embodiment

Figure 11:
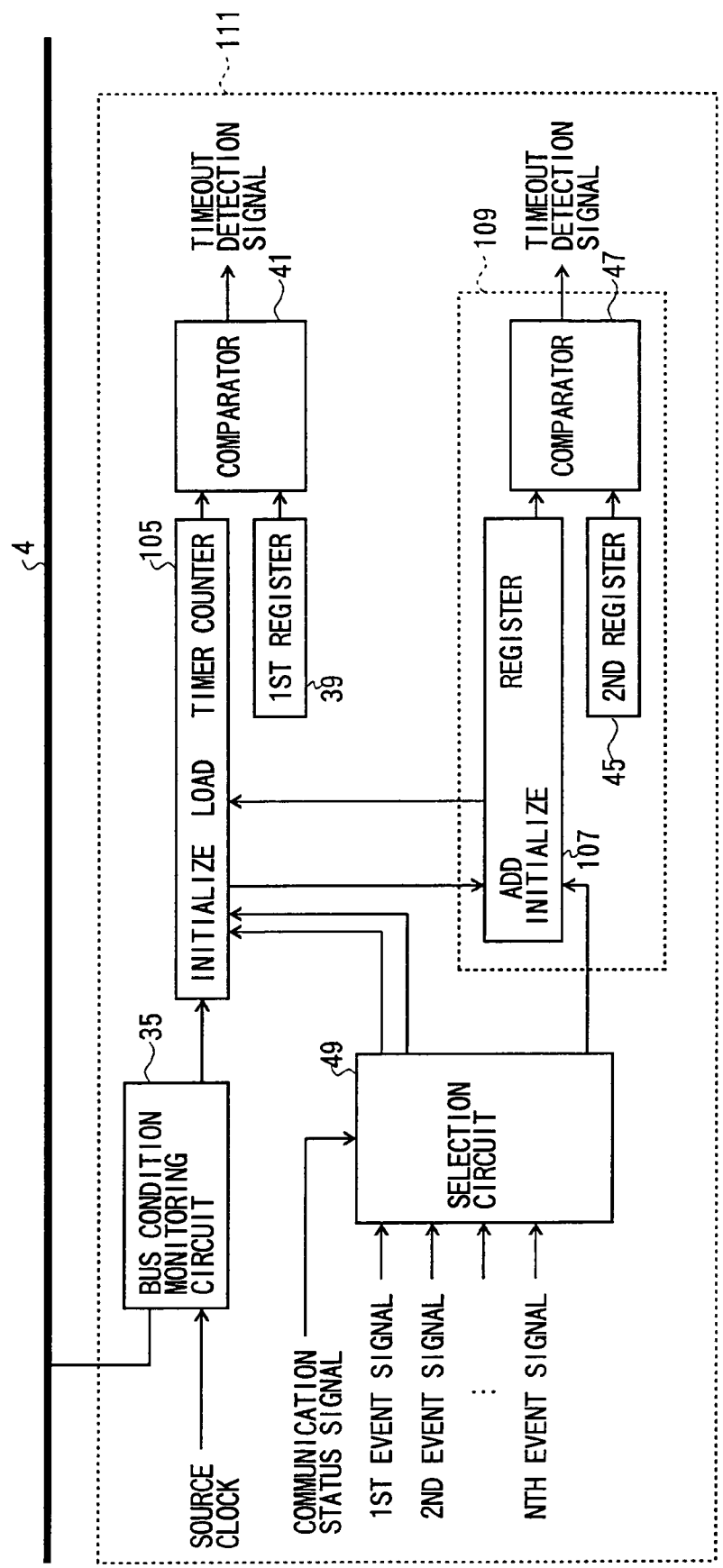
FIG. 11 is an illustration of a structure of an abnormality detection device according to a fourth embodiment of the present invention.

FIG. 11 is an illustration of a structure of an abnormality detection device 111 according to a fourth embodiment of the present invention. As shown in FIG. 11, the abnormality detection device 111 has a similar structure to the abnormality detection device 13 according to the first embodiment shown in FIG. 2, except for comprising a timer counter 105 in place of the timer counter 37, and an adder 109. That is, as for the adder 109, the timer counter 43 shown in FIG. 2 is replaced by a register 107 which executes addition. The register 107 is connected to the selection circuit 49, the timer counter 105 and the comparator 47.

The abnormality detection device 111 having this structure operates in the same manner as the abnormality detection device 13 according to the first embodiment shown in FIG. 2, except in the following respects.

The timer counter 105 supplies a value counted therein to the register 107 according to the event signal supplied from the selection circuit 49. The register 107 adds up the supplied counted value. It is noted that the register 107 is initialized according to the event signal supplied from the selection circuit 49.

Then, when a cumulative total of the counted value equals a predetermined value (threshold value) stored beforehand in the second register 45, the comparator 47 outputs the timeout detection signal.

Also, the register 107 loads the cumulative total of the counted value into the timer counter 105 according to the event signal supplied from the selection circuit 49. In this case, the timer counter 105 counts up the value by using the loaded cumulative total of the counted value as an initial value.

As described above, the abnormality detection device 111 according to the fourth embodiment can provide the same effect as the abnormality detection device 13 according to the first embodiment. Further, in the adder 109, the register 107 adds up the value counted by the timer counter 105, and the register 107 loads the cumulative total of the counted value into the timer counter 105 so that a way of counting by the timer counter 105 can be easily changed. This enhances a degree of freedom in arranging a threshold value (timeout limit) for detecting a time out.

The present invention is not limited to the specifically disclosed embodiments, and variations and modifications may be made without departing from the scope of the present invention.

The present application is based on Japanese priority application No. 2000-077016 filed on Mar. 17, 2000, the entire contents of which are hereby incorporated by reference.

What is claimed is:

1. An abnormality detection device for detecting an abnormality in a communication bus, the device comprising:
   a timer counter configured to measure a time during which a logical output of said communication bus remains at a first logical level which is a high level or a low level;
   a comparator configured to compare the time measured by said timer counter with a threshold value and to output an abnormality detection signal indicating an abnormality in said communication bus when the time surpasses said threshold value, wherein the abnormality detection device is independent of a CPU controlling the communication bus and detects the abnormality directly from the communication bus;
   a plurality of comparison value registers respectively configured to store a plurality of threshold values; and
   a selector configured to store a threshold value from among said plurality of said threshold values according to a selection signal supplied thereto so as to supply said threshold value to said comparator.

2. The abnormality detection device as claimed in claim 1, wherein said timer counter is initialized at intervals determined according to an event signal supplied thereto.

3. The abnormality detection device as claimed in claim 2, comprising at least two units of said timer counter and said comparator, the timer counter in each of said units being individually initialized at said intervals.

4. The abnormality detection device as claimed in claim 1, wherein the abnormality detector device detects the abnormality directly from the communication bus by hardware.

5. An abnormality detection device for detecting an abnormality in a communication bus, the device comprising:
   at least two timer counters each configured to measure a time during which a signal transmitted through said communication bus continues to be a first logical level;
   a register configured to cumulatively add the time measured by at least one of said at least two timer counters, the register being initialized at predetermined intervals; and
   a comparator configured to compare the time cumulatively added by said register with a threshold value and to output an abnormality detection signal indicating an abnormality in said communication bus when the cumulative time obtained by said register surpasses said threshold value, wherein the abnormality detection device is independent of a CPU controlling the communication bus and detects the abnormality directly from the communication bus.

6. The abnormality detection device as claimed in claim 5, wherein said register supplies said cumulative time to at least one of said at least two timer counters, and
   said at least one of said at least two timer counters measures the time by using said cumulative time as an initial value.

7. The abnormality detection device as claimed in claim 5, which detects the abnormality directly from the communication bus by hardware.

8. An abnormality detection device to detect an abnormality in a communication bus, the device comprising:
   at least two timer counters each configured to measure a time during which a signal transmitted through said communication bus continues to be a first logical level;
   a register configured to cumulatively add the time measured by at least one of said at least two timer counters, the register being initialized at predetermined intervals; and
   a comparator configured to compare the time cumulatively added by said register with a threshold value and to output an abnormality detection signal indicating an abnormality in said communication bus when the cumulative time obtained by said register surpasses said threshold value,
   wherein said register supplies said cumulative time to at least one of said at least two timer counters, and
   said at least one of said at least two timer counters measures the time by using said cumulative time as an initial value.

9. An abnormality detection device to detect an abnormality in a communication bus, comprising:
   at least two timer counters each configured to measure a time during which a signal transmitted through said communication bus continues to be a first logical level;
   a circuit configured to cumulatively add the time measured by at least one of said at least two timer counters; and
   a comparator configured to compare the time cumulatively added by said circuit with a threshold value and to output an abnormality detection signal indicating an abnormality in said communication bus when the cumulative time obtained by said circuit surpasses said threshold value,
   wherein said circuit supplies said cumulative time to at least one of said at least two timer counters, and
   said at least one of said at least two timer counters measures the time by using said cumulative time as an initial value.

* * * * *